United States Patent
Konopka et al.

(10) Patent No.: US 7,447,635 B1
(45) Date of Patent: Nov. 4, 2008

(54) NATURAL LANGUAGE INTERFACE CONTROL SYSTEM

(75) Inventors: Courtney C. Konopka, Carlsbad, CA (US); Lars Cristian Almstrand, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1572 days.

(21) Appl. No.: 09/692,846

(22) Filed: Oct. 19, 2000

Related U.S. Application Data

(60) Provisional application No. 60/160,281, filed on Oct. 19, 1999.

(51) Int. Cl.
*G10L 11/00* (2006.01)

(52) U.S. Cl. ............... 704/275; 704/231; 704/251; 704/9

(58) Field of Classification Search ............... 704/1, 704/9, 10, 270, 272, 275, 257, 256, 246, 704/251, 231
See application file for complete search history.

(56) References Cited

U.S. PATENT DOCUMENTS

| | | | | | |
|---|---|---|---|---|---|
| 4,827,520 | A | * | 5/1989 | Zeinstra | 704/275 |
| 5,513,298 | A | * | 4/1996 | Stanford et al. | 704/243 |
| 5,615,296 | A | * | 3/1997 | Stanford et al. | 704/270.1 |
| 5,748,841 | A | | 5/1998 | Morin et al. | |
| 5,748,974 | A | * | 5/1998 | Johnson | 704/270 |
| 5,797,123 | A | * | 8/1998 | Chou et al. | 704/256 |
| 5,855,002 | A | * | 12/1998 | Armstrong | 704/270 |
| 5,878,394 | A | * | 3/1999 | Muhling | 704/275 |
| 6,052,666 | A | * | 4/2000 | Diehl et al. | 704/275 |
| 6,085,160 | A | * | 7/2000 | D'hoore et al. | 704/256 |
| 6,112,174 | A | * | 8/2000 | Wakisaka et al. | 704/251 |
| 6,298,324 | B1 | * | 10/2001 | Zuberec | 704/251 |
| 6,324,512 | B1 | * | 11/2001 | Junqua et al. | 704/275 |
| 6,408,272 | B1 | * | 6/2002 | White et al. | 704/270.1 |
| 6,442,522 | B1 | * | 8/2002 | Carberry et al. | 704/257 |
| 6,499,013 | B1 | * | 12/2002 | Weber | 704/257 |

(Continued)

FOREIGN PATENT DOCUMENTS

EP 0386765 A2 12/1990

(Continued)

OTHER PUBLICATIONS

Wyard etal., "Spohln Language Systems—Beyond prompt and response" BT Technology vol. 14, 1996.*

(Continued)

*Primary Examiner*—Patrick N. Edouard
*Assistant Examiner*—Lamont Spooner
(74) *Attorney, Agent, or Firm*—Fitch, Even, Tabin & Flannery

(57) ABSTRACT

A natural language interface control system for operating a plurality of devices consists of a first microphone array, a feature extraction module coupled to the first microphone array, and a speech recognition module coupled to the feature extraction module, wherein the speech recognition module utilizes hidden Markov models. The system also comprises a natural language interface module coupled to the speech recognition module and a device interface coupled to the natural language interface module, wherein the natural language interface module is for operating a plurality of devices coupled to the device interface based upon non-prompted, open-ended natural language requests from a user.

34 Claims, 4 Drawing Sheets

U.S. PATENT DOCUMENTS 6,584,439 B1 * 6/2003 Geilhufe et al. ............ 704/270

FOREIGN PATENT DOCUMENTS

| EP | 0834862 | 8/1998 |
| EP | 0834862 A2 | 8/1998 |
| KR | 1998037008 | 8/1998 |

OTHER PUBLICATIONS

Giuliani et al., Hands Free Continuous Speech Recognition in Noisy Environment Using a Four Microphone Array, 1995 IEEE, p. 860-863.*

Kawabata T. Topic Focusing Mechanism For Speech Recognition Based On Probabilistic Grammar and Topic Markov Model, Proceedings of the International Conference on Acoustics, Speech and Signal Processing (ICASSP), US, New York, IEEE, May 9, 1995, pp. 317-320, ISBN: 0-7803-2432-3.

PCT International Preliminary Examining Authority, Written Opinion, PCT/US00/29036, Nov. 13, 2001.

PCT International Application Publication under the PCT, WO 99/50830 Publication Date, Oct. 7, 1999.

Computer-steered microphone arrays for sound transduction in large rooms J.L. Flanagan, J.D. Johnston, R. Zahn, (11 pages).

* cited by examiner

NATURAL LANGUAGE INTERFACE CONTROL SYSTEM

This application claims priority under 35 U.S.C. § 119(e) to U.S. Provisional Patent Application Ser. No. 60/160,281, filed Oct. 19, 1999, of Konopka, for A NATURAL LANGUAGE INTERFACE FOR PERSONAL ELECTRONIC PRODUCTS, which U.S. Provisional Patent Application is incorporated herein by reference.

BACKGROUND OF THE INVENTION

1. Field of the Invention

The present invention relates to speech recognition, and more specifically to natural language speech recognition. Even more specifically, the present invention relates to a natural language speech recognition system used to control an application.

2. Discussion of the Related Art

Many have dreamed of a device that could completely bridge the gap or seam between man-made machines and humans. Speech recognition techniques have been used to enable machines to recognize human speech. For example, speech recognition technology is used in many applications, such as word processing, control of devices, and menu driven data entry.

Most users prefer to provide the input speech in the form of a natural language. Natural language is written or spoken input that is in natural form such as if the user is actually conversing with the machine. In contrast, non-natural language is limited in syntax and structure. To communicate with the machine in non-natural language, the user must know and speak commands or requests according to the syntactic and semantic structure of the speech recognition engine.

Advantageously, a natural language interface system permits the user to easily interface with the machine or system, since the user can simply speak in a conversational manner without having to remember the proper format to speak a command or request. Disadvantageously, natural language interface systems are difficult to implement due to the complex and shifting "rules" of human natural language.

Furthermore, natural language processing of the prior art has been inefficient and rigid in its ability to recognize the meaning of natural language utterances. As such, in order to limit the context of the user's natural language input and ease the processing of the input speech, conventional natural language interface systems are dialog-based or prompt-driven. The natural language interface controls the context of the speech being input to the system. For example, natural language interfaces have been implemented as automated phone systems, such as an automated natural language airline reservation system. Such systems prompt the user to speak within a certain context. For example, the natural language system asks the user what city would the user like to fly. As such, the system dictates to the user the context of the speech it expects. Thus, the natural language interface system will look for natural language indicating names of cities. Next, the system will prompt the user to speak what date the user would like to fly. Again, the context of the response is dictated by the natural language interface system. Disadvantageously, the user is unable to provide open-ended information or an open ended request. If the received speech data is not within the context as prompted by the system, the system will either ignore the request, inform the user that the response is not understood or potentially misinterpret the request as falling within the context of the prompt.

What is needed is an efficient natural language system in which the context is not limited by the natural language processing, but is limited by the user's speech. The present invention advantageously addresses the above and other needs.

SUMMARY OF THE INVENTION

The present invention advantageously addresses the needs above as well as other needs by providing an open-ended natural language interface control system for controlling multiple devices whose context is not defined by the natural language interface, but by the direction of the user and the capabilities of the multiple devices.

In one embodiment, the invention can be characterized as a natural language interface control system for operating a plurality of devices comprising a first microphone array, a feature extraction module coupled to the first microphone array, and a speech recognition module coupled to the feature extraction module, wherein the speech recognition module utilizes hidden Markov models. The system also comprises a natural language interface module coupled to the speech recognition module and a device interface coupled to the natural language interface module, wherein the natural language interface module is for operating a plurality of devices coupled to the device interface based upon non-prompted, open-ended natural language requests from a user.

In another embodiment, the invention can be characterized as a method of speech recognition comprising the steps of: searching for an attention word based on a first context including a first set of models, grammars, and lexicons; and switching, upon finding the attention word, to a second context to search for an open-ended user request, wherein second context includes a second set of models, grammars, and lexicons.

In a further embodiment, the invention can be characterized as a method of natural language control of one or more devices, and a means for practicing the method, the method comprising the steps of: receiving an attention word, wherein the attention word indicates that an open-ended, natural language user request will be received; receiving the open-ended, natural language user request; matching the open-ended natural language request with the most likely command corresponding the open-ended natural language request; and transmitting the command to a respective one of the one or more devices.

BRIEF DESCRIPTION OF THE DRAWINGS

The above and other aspects, features and advantages of the present invention will be more apparent from the following more particular description thereof, presented in conjunction with the following drawings wherein.

DETAILED DESCRIPTION OF THE PREFERRED EMBODIMENTS

The following description of the presently contemplated best mode of practicing the invention is not to be taken in a limiting sense, but is made merely for the purpose of describing the general principles of the invention. The scope of the invention should be determined with reference to the claims.

Figure 1:
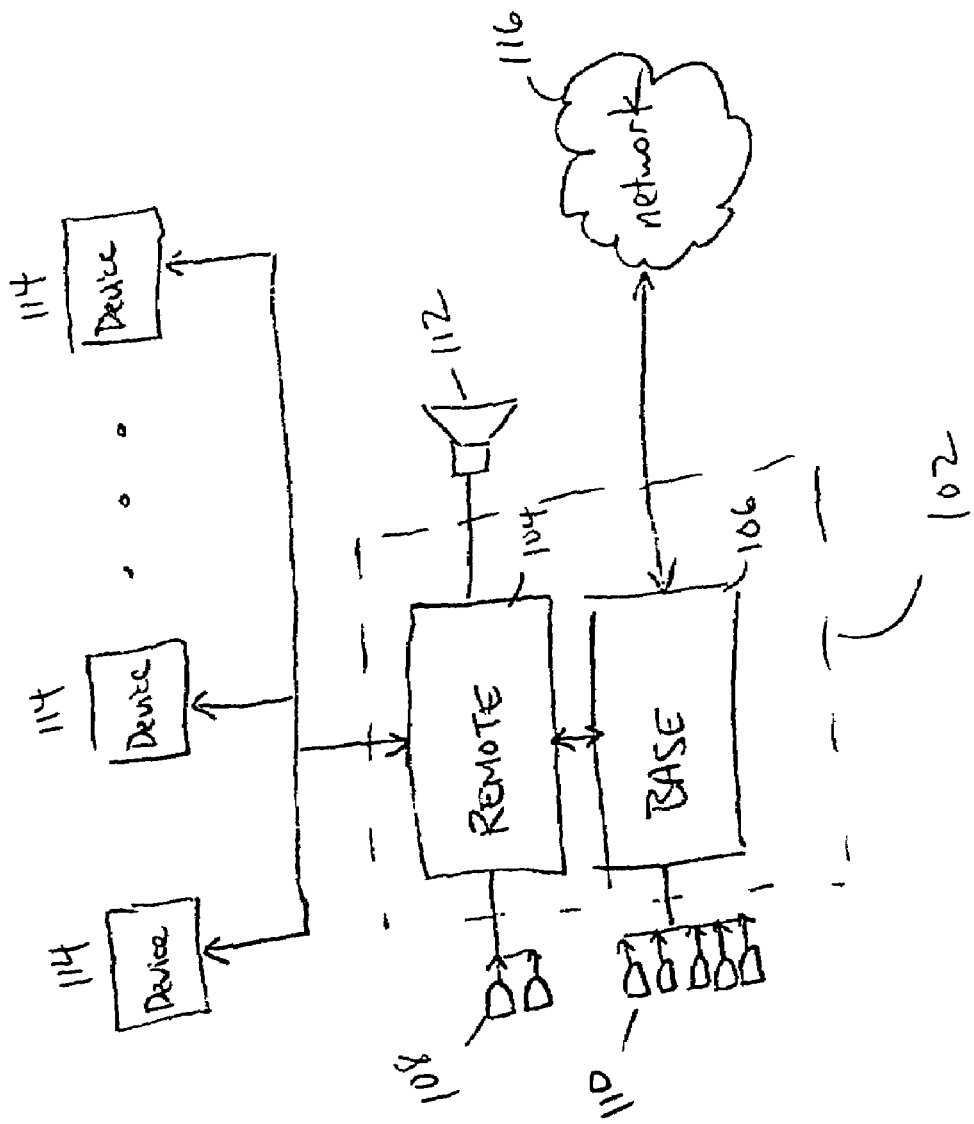
FIG. 1 is a system level block diagram of a natural language interface control system (NLICS) in accordance with one embodiment of the invention.

Referring first to FIG. 1, a system level block diagram is shown of a natural language interface control system in accordance with one embodiment of the invention. Shown is the natural language interface control system 102 (also referred to as the NLICS 102) having a remote unit 104 and a base unit 106 (also referred to as a base station 106). The remote unit 104 has a linear microphone array 108 and a speaker 112 and the base unit 106 has a planar microphone array 110. The remote unit 104 is coupled to multiple devices 114 controllable via the natural language interface control system 102. Furthermore, the base unit 106 is coupled to an external network 116.

In operation, the natural language interface control system 102 eliminates the seam between the multiple devices 114 and the user for control purposes. The natural language interface control system 102 provides a natural language interface such that a user may control one or more of the multiple devices 114 by simply speaking in a natural, conversational manner to the natural language interface control system 102. The NLICS 102 is able to interpret the natural language request of the user and issue the appropriate command to the respective device(s) to effect the user's request. For example, in a home application, the devices 114 may include a television, a stereo, a video cassette recorder (VCR), a digital video disk (DVD) player, etc. When the user wishes to operate one of the devices 114, the user simply speaks, "I wanna watch TV", or another natural language equivalent. The NLICS 102 includes a speech recognition module utilizing hidden Markov models (HMMs), as known and understood in the art, to detect the speech and uses a natural language interface to interpret the natural language and determine the probability of what the appropriate user request is. The natural language interface utilizes probabilistic context free grammar (also referred to as PCFG) rules and lexicons that are stored for each of the respective devices 114. As such, the natural language interface module includes a device abstraction module that contains an abstraction of each device 114 that the NLICS 102 is designed to interface. Thus, each device 114 is abstracted into a set of commands that are understandable by the respective devices 114. Furthermore, each abstraction is associated with individual grammars and lexicons specific to the respective device.

Once the request is determined with the desired level of confidence, the natural language interface module issues a sequence of command(s) to the appropriate device(s) to effect the user's request. For example, in response to a user's request of "I wanna watch TV", the natural language interface module will issue command(s) to the appropriate device(s) to turn on the television and amplifier, set the television and amplifier to the proper modes, and set the volume to an appropriate level. It also updates the states and settings of these devices in its internally maintained abstractions. The command may even turn the television to a preferred channel as learned by the NLICS 102 or as requested by the user in the open ended natural language request. As a further example, the user may request specific information, such as "Do you have the album 'Genesis'?" to which the system would respond "Yes". The user could then respond "Play that", or "Play the album Genesis". The system would respond by turning on the CD jukebox and the amplifier, setting the proper mode for the amplifier, setting the proper volume level, selecting the proper album and finally, playing the album. It would also update the internally maintained states and settings of the device abstractions as well as the user's profile. Preferably, this command signal is transmitted via a radio frequency (RF) link or an Infrared (IR) link, as are known in the art.

Speech recognition techniques are well known in the art and the control of devices based upon spoken commands is known. For example, applications exist where a user speaks a predetermined speech command to a speech recognition control system, for example, the user speaks, "Turn on" to a controlled television set. In response, the TV is turned on. However, such approaches do not take advantage of the use of natural language or conversational language, nor abstract the devices under control to derive dialog context. If the exact predetermined voice command is not issued, then the system will not issue the command. In contrast, this embodiment implements a natural language interface module which is used to determine probabilistically the most likely meaning of the spoken utterance and issue the appropriate command (s). Thus, the instructions from the user come in a very conversational manner without having to remember a specified command signal. For example, if the user states "hey, lets watch TV", "I wanna watch TV", "turn on the TV", "whattya say we watch a little television", the system will use its natural language interface module to probabilistically determine that the user is requesting to watch the television, and will issue an appropriate set of command(s) that the television and other appropriate devices will understand.

Thus, advantageously, the physical interface or seam between the device 114 and the user is eliminated. For example, the user does not even need to know how to operate the device 114 in question. For example, the user may not know how to operate the DVD player; however, the user can simply say, "I want to watch a DVD" and a command signal may be sent to power on the DVD player and begin playing the DVD within the player.

Furthermore, the natural language interface module disambiguates the user's request if it is not sure what the request means. For example, the request may be "I want to watch a movie". The natural language interface module does not know if the user would like to watch a movie on the DVD player, the VCR or a television movie. In such cases, the natural language interface module includes a feedback module (e.g. a text-to-speech module) and a feedback mechanism such as a speaker to ask the user to clarify the request. For example, the natural language interface module will ask in response to such a request, "Do you want to watch a movie on the DVD, VCR or television?" At which point the user may reply "DVD", for example.

As such, the system is a true "natural language interface" that can accept "open-ended" requests. The natural language interface control system 102 is not a "closed-ended" system that is primarily dialog driven or prompt driven. For example, in known natural language systems, the conversation must be controlled by the system by prompting the user to provide certain information that the system will then try to identify. For example, in a natural language based airline reservation system, the system will guide the user through the dialog such that the context is constrained by the questions asked by the system. For example, the system will ask, "To what city would you like to fly?" Then the user would respond, in natural language, with the destination city and the system will essentially try to understand the response by trying to match the response with the names of cities. Then the system will prompt the user by asking "What date would you like to leave?" and the system will then constrain the context of the search and analysis of the incoming text strings based on what it is expecting to receive, i.e., dates. In contrast, with respect to the NLICS 102, the user, not the system, initiates the dialog. The user simply states "I want to hear some music" with no prompting from the NLICS 102. The context of the search is not constrained by the prompting of the system, but is constrained by the abilities of the devices 114 controlled by the NLICS 102. Thus, the user may ask for the NLICS 102 to perform any of the tasks that each of the controlled devices is capable of performing. If, for example, the user asks the NLICS 102 to perform a function that is not available from the controlled devices, e.g., if the user says "Make me some breakfast", the NLICS 102 is not able to effect such a request because it is not within the programmed functionality of the controlled devices. For example, the NLICS 102 will properly interpret phrases within the abilities of the devices 114 and simply ignore other requests. Advantageously, the feedback portion of the natural language interface module will alert the user that the request is not available.

In this embodiment, the natural language interface control system 102 is "always on", such that the user may speak a request at any time and the system will respond. However, to get the attention of the NLICS 102, the user speaks an "attention word" followed by the request. This functions to identify the user, to avoid false detections of requests and to distinguish between regular conversation and background noise not intended for the NLICS. This attention word notifies the NLICS 102 that following the attention word, a request will arrive. As such, the microphone arrays employed by the NLICS only have to search for the attention word or words within the physical space defined by the microphone arrays. For example, if the attention word is programmed as "Mona", then the user's request becomes "Mona, I wanna watch TV." This greatly reduces the processing and searching by the microphone arrays.

Furthermore, individual users may have separate attention words specific to that user. For example, within a household, a first user's attention word is "Mona" while a second user's attention word is "Thor". When the NLICS 102 hears the attention word "Mona", the system assumes that the first user is issuing the command. For example, if the first user says, "Mona, I wanna watch TV", then the system will not only turn on the television (and other relevant devices), but the system will turn on the television to the first user's selected favorite channel. Note that this does not provide a true identification; however, since the first user could say the second user's attention word. This mechanism simply provides a means to tailor the experience of the NLICS 102 specifically to the likes, pronunciations and habits of individual users.

One feature that enables the NLICS 102 to function efficiently is that each of the devices 114 coupled to the NLICS 102 are abstracted into a separate device abstraction such that separate grammars and lexicons are stored for each of the devices 114. For example, as the natural language interface module determines that the request is for the DVD player, a grammar and lexicon specific to that particular context (i.e., the context of the DVD player) is used to aid in the processing of the arriving acoustic data within the speech recognition module. This provides a context switching feature in the speech recognition module.

In some embodiments, the NLICS 102 is set up such that models used in the speech recognition module for the HMMs and grammars can be streamed into use from a secondary source, such as a hard disk, CD-ROM, or DVD at run time. Once the data is read in, it can be immediately used without any preprocessing. As such, memory usage for the speech recognition module is improved since many models and grammars can be stored remotely of the memory of the NLICS 102.

In other embodiments, the NLICS 102 is designed to be implemented as two separate units, for example, the remote unit 104 and the base unit 106. The base unit 106 functions as a "docking station" for the remote unit 104, which may be coupled to the base unit 106 via a universal serial bus (USB) connection, for example. In some embodiments, the remote unit 104 functions as a universal remote control for a variety of devices as is traditionally done, by providing buttons for the user to press. Furthermore, the base unit 106 provides an external network interface for the NLICS 102. For example, the external network interface couples the NLICS to an external network 116, such as a home local area network (LAN), an Intranet or the Internet. As such, the NLICS 102 may download additional grammars, HMM models, device abstractions, CD, DVD, television or other programming information and/or lexicons that are maintained in central databases within the external network 116.

Additionally, the base unit 106 functions as a secondary cache for the remote unit 104. The remote unit 104 includes a feature extraction module, a speech recognition module, and a natural language interface module, as well as the device interface to the various devices. As such, the base unit 106 includes a memory that functions to hold additional models, grammars, and lexicons to be used in the remote unit 104.

The remote unit 104 includes a traditional two element linear microphone array 108 that receives acoustic signaling. Also, the base unit 106 contains a planar microphone array 110 which listens to acoustic energy from a two-dimensional space. The NLICS 102 advantageously uses both microphone arrays 108 and 110 to implement a three-dimensional microphone array such that together the two sets of microphone arrays 108 and 110 listen to a predefined three-dimensional physical space. As such, a three-dimensional volume can be defined within a space, for example, the NLICS 102 can be configured to listen to a volume including a living room couch where a user may be sitting when operating respective devices. As such, acoustical data coming from sources outside of this defined space will attenuate while acoustical data coming from within the defined space will be summed in phase.

Although the system has generally been described above, a more detailed description of the natural language interface control system follows.

Figure 2:
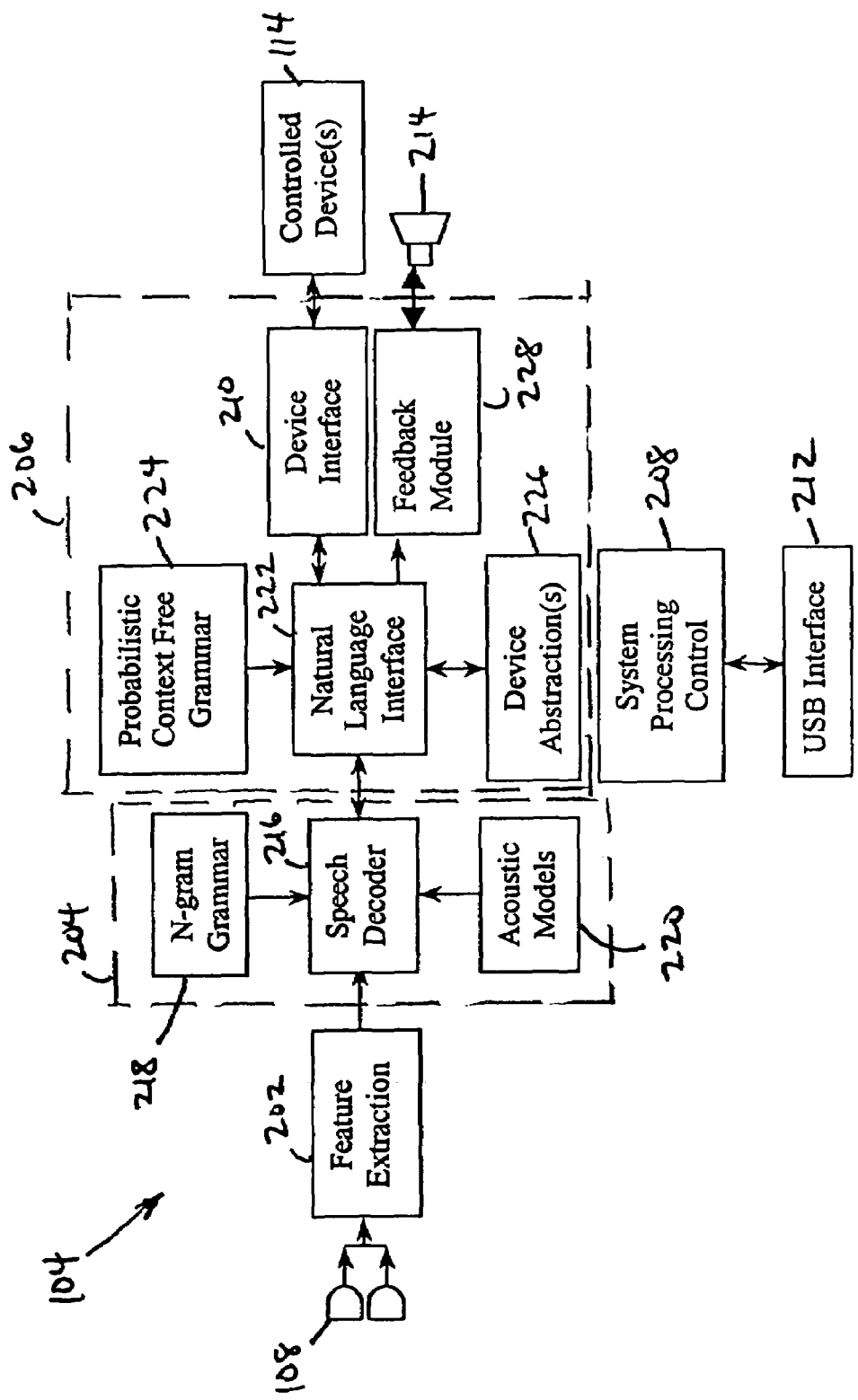
FIG. 2 is a functional block diagram of a remote unit of the natural language interface control system (NLICS) of FIG. 1 in accordance with another embodiment of the invention.

Referring next to FIG. 2, a functional block diagram is shown of the remote unit 104 of the natural language interface control system 102 of FIG. 1 in accordance with another embodiment of the invention. Shown is the remote unit 104 including the linear microphone array 108, a feature extraction module 202, a speech recognition module 204, a natural language interface control module 206, a system processing controller 208, a device interface 210, a base unit interface 212 (also referred to as a universal serial bus (USB) interface 212), and a speaker 214. Also illustrated are the devices 114. The speech recognition module 204 includes a speech decoder 216, an N-gram grammar module 218, and an acoustic models module 220. The natural language interface control module 206 includes a natural language interface module 222, a probabilistic context free grammar module 224 (also referred to as the PCFG module 224), a device abstraction module 226 and a feedback module 228.

Although the system has been described as two separate components, i.e., the remote unit 104 and the base unit 106, the core functionality of the NLICS 102 may be implemented solely within the remote unit 104, although preferred embodiments utilize both the remote unit 104 and the base unit 106 as separate units. As such, the remote unit 104 will be described first below, followed by a description of the base unit 106.

Acoustic data enters the remote unit 104 via the linear microphone array 108, which is a two element narrow-cardioid microphone that localizes a source, i.e., the user, and discriminates against interfering noise. Such linear microphone arrays are well known in the art. The linear microphone array 108 samples the input speech data from each of the microphone elements, and then time aligns and sums this data in order to produce a signal-to-noise ratio (SNR)-enhanced representation of the incoming acoustic signal.

The acoustic data is then passed to the feature extraction module 202, which is used to extract parameters or feature vectors representing information related to the incoming acoustic data.

The feature extraction module 202 performs edge-detection, signal conditioning and feature extraction. According to one embodiment, speech edge detection is accomplished using noise estimation and energy detection based on the $0^{th}$ Cepstral coefficient and zero-crossing statistics. Feature extraction and signal conditioning consist of extracting Mel-frequency cepstral coefficients (MFCC), delta information and acceleration information. It is a 38 dimensional feature vector based on 12.8 ms sample buffers overlapped by 50%. Such feature extraction modules 202 and functionality are well understood in the art, and one skilled in the art may implement the feature extraction module in a variety of ways. Thus, the output of the feature extraction module 202 is a sequence of feature vectors.

Next, generally, the speech recognition module 204 functions as a Hidden-Markov Model (HMM)-based continuous speech recognizer that has the ability to reject "unmodeled events", e.g. out-of vocabulary events, disfluencies, environmental noise, etc. The speech recognition module 204 is under the control of the natural language interface module 222 and can switch between different acoustic models and different grammars based on the context of the speech, as determined by the natural language interface control module 206. The speech recognition module 204 may be entirely conventional, although the speech recognition module 204 has several features which are advantageous for use in the NLICS 102. Furthermore, memory usage in the speech recognition module 204 has been optimized so that the memory requirement is mainly a reflection of the amount of acoustic speech model data used. A more detailed description follows of the speech recognition module 204 and the natural language interface control module 206.

The feature vectors from the feature extraction module 202 are input to the speech recognition module 204, i.e., input to the speech decoder 216 of the speech recognition module (SRM) 204. Thus, the speech recognition module (SRM) 204 is responsible for requesting speech feature vectors from the feature extraction module (FEM) 202 and finding the most likely match of the corresponding utterance with a set of speech models, while rejecting non-speech events, using an approach based on Hidden Markov Models (HMMs).

The models used by the speech decoder 216 are stored in the acoustic models module 220. These models may comprise context-dependent or independent phonetic models, sub word models or whole word models, e.g. monophones, biphones and/or triphones. In one embodiment, the speech decoder 216 may dynamically switch between different models, e.g., the speech decoder 216 may switch between models based on triphones and monophones. This is in contrast to known systems, where there are a fixed number of states and Gaussians per state, i.e. the architecture of the respective phonemes is fixed. In contrast, a selection between models based on monophones, biphones, and triphones, as well as varying the architecture of these phonemes, e.g., the number of states and the number of Gaussians per state for each type of phoneme (monophone, biphone, and triphone) may be varied for optimization in space, speed, and accuracy. As is well understood in the art, the received utterances are analyzed with the models, e.g., using a Viterbi algorithm, and scores are assigned representing how well the utterance fits the given models. Furthermore, the models used by the speech decoder 216 are under direct control by the natural language interface control module 206, which is described further below.

Additionally, two garbage-modeling techniques are utilized. Garbage filler models are stored with the acoustic models module 220 to model background noises as well as disfluencies and "silences". These models are utilized by the speech decoder 216 in the rejection of out-of-vocabulary (oov) events. The speech decoder 216 also rejects out-of-vocabulary (oov) events using an online garbage calculation. It then returns the N-best candidates if their scores are very close. Such out-of-vocabulary rejection is also well understood in the art.

In some embodiments, the rejection techniques have been improved compared to those known in the art. The basic principle behind HMM-based speech recognition systems is that an utterance is compared with a number of speech models (from the acoustic models module 220) in order to find the model that best matches the utterance. This implies that the output of the speech recognition module 204 will be a reference to the model (e.g. word) with the best match. However, this causes problems in cases where no models exist that represent the words spoken. In such cases, an HMM-based system will typically still attempt to find the closest match between utterances and models and report the results. In many cases this is unwanted, as any sound that is picked up by an open microphone will cause a reference to a model to be emitted. To avoid this effect, it is sometimes preferred to determine whether the utterance is contained within in-vocabulary words or not. For example, if a Viterbi score passes a threshold, the utterance is determined to be an in-vocabulary word. If the Viterbi score of the utterance does not exceed the threshold, then the utterance is deemed out-of-vocabulary. Such a Viterbi score is generated using the Viterbi algorithm. This algorithm calculates a single best state sequence through an HMM and its corresponding probability, given an observation sequence. However, experiments have shown that this is not a very accurate rejection scheme. Instead, many systems rely on comparing the Viterbi score with another Viterbi score that is obtained by reprocessing the utterance through an alternative HMM whose task is to represent all out-of-vocabulary events or filler sounds, i.e., using garbage models. A garbage score can then be defined as the difference between the logarithms of each of the two Viterbi scores divided by the number of frames in the utterance according to equation 1 below. The garbage score reveals whether the utterance had a closer match with the word models or the out-of-vocabulary models. Many variants have been proposed as to how to reject out-of-vocabulary events. One observation is that periods of silence in an utterance typically produce high Viterbi scores even for models that are supposed to model high-energy parts-of-speech. To some extent, this can be avoided by providing an additional feature representing the energy of the speech signal in the feature extraction module 202. However, this still leads to incorrect garbage score measurements. If there is silence in the beginning or ending of an utterance and this beginning or ending silence is not being modeled, it has been observed that the garbage scores are indeed affected. The feature extraction module 202 performs speech detection such that the beginning and ending silences should not be included in the sample forwarded to the speech decoder 216 of the speech recognition module 204. However, finding the beginning and ending of an utterance becomes a complex task for utterances that begin or end with low-energy sounds. An example of a group of sounds where this is a problem is the fricative. Fricatives are characterized as broadband, low energy noise, e.g. "white noise". A fricative, as known in the art, is a sound, as exemplified by such phonemes as "th", "sh", etc. The feature extraction module 202 attempts to solve this problem by making its best efforts to find the beginning and ending samples. To guarantee that low-energy sounds are included in the speech sample, the feature extraction module 202 includes a number of extra samples in the beginning and ending of the utterance. In cases where there is no low-energy sound in the beginning or ending of an utterance, this implies that silence will be prepended and appended to the speech sample, assuming that the utterance was spoken in isolation, and hence the garbage scores in the speech decoder 216 become skewed. To solve this problem, in one embodiment, each model is preceded and followed by a single-state silence model that "consumes" the frames of silence passed along from the feature extraction module 202. The speech decoder 216 then finds the sequence of models with the closest match and optimally aligns the silence models as well as the word-models with the utterance. Now the start and end indices for the beginning and ending silence portions of the utterance can be obtained and removed. Furthermore, the best matching word models are now kept and reprocessed without the preceding and following silence models, using only the pure-speech portion of the utterance. Next, the out-of-vocabulary HMMs process the same portion of the utterance and the garbage scores can be calculated as, $$s = \frac{w-g}{n-m}, \quad (1)$$

where w is the logarithm of the Viterbi score for the acoustic models of in-vocabulary words without preceding or following silence models and where no silence is included in the utterance. Similarly, g is the logarithm of the corresponding score for the out-of-vocabulary HMM models. Also, n is the total number of frames in the utterance and m is the number of frames that were consumed by the preceding and following silence models. In summary, using this rejection technique, the system is better able to accurately isolate the speech portion of the utterance. This has the effect of better isolating in-vocabulary words and rejecting out-of vocabulary events that begin or end with low energy sounds, such as fricatives, in comparison to conventional rejection schemes.

The N-gram grammar module 218 includes the grammars used by the speech decoder 216. These grammars are the rules by which lexicons are built and a lexicon is a dictionary consisting of words and their pronunciation entries. The specific grammars used by the speech decoder 216 are also controlled by the natural language interface module 222. In this embodiment, the N-gram grammar is configured to use multiple grammar types or a combination of grammar types. For applications (e.g., controlled devices with many controls and functions) that use a complex language it might be advantageous to use the trigram grammar option. For smaller systems (e.g., a device with very simple controls and functions), the bigram grammar option might constitute a better memory and accuracy tradeoff. To provide a memory efficient representation of the bigram and trigram grammars, the allowed combinations of lexicon entries can be expressed in terms of specific lexicon entry labels or word groups. If any lexicon entry should be able to follow upon any lexicon entry, the ergodic grammar option can be used.

It is noted that the use of an N-gram grammar within a device that generally has a small footprint is not intuitive. By a small footprint, it is meant that the system only has to recognize speech relating to the controlled devices 114 coupled to the remote unit 104, such that it can classify the remaining speech as out-of-vocabulary. However, the N-gram grammar module 218 allows for the use of multiple grammars and types even in the case of a speech recognition module 204 having a small footprint.

Another grammar that is mainly used for the rejection scheme of the speech decoder 216 is the word list grammar. The word list grammar is used to recalculate the Viterbi score for a fixed sequence of words and a subset of an utterance.

The system incorporates the various grammars in such a way that allows for "context switching" or the immediate switching between grammar types and sets of grammar rules under the control of the natural language interface module. Being able to do so is important as the content of a person's speech is highly affected by context. For example, only certain phrases (e.g., the attention words described above) are expected to begin a dialog while others could only follow upon a question (e.g., the natural language interface disambiguating an unclear request). In particular, this becomes evident when a speaker is targeting different audiences, and in the case of consumer electronics—different products, such as a television, a DVD player, a stereo, and a VCR. As an attempt to keep the processing requirements low while increasing the speech recognition accuracy, the system provides a way to define contexts for which only certain grammar rules should apply. If the context is known, the natural language interface module 222 can instruct the speech recognition module 204 to listen only to phrases that are expected. For example, when the natural language interface module 222 has determined that the user is attempting to operate the DVD player, the speech recognition module 204 may be instructed to use the grammar type and grammar corresponding to the DVD player. Thus, the speech decoder 216 will retrieve the proper grammar from the N-gram grammar module 218. Context switching can also be performed on a finer level where a flag for each grammar rule or lexicon entry is used to indicate which individual rules or words are to be enabled and disabled. Further, for some system settings and some grammar modes it might be preferred to limit the search for the best hypothesis to a set of lexicon entries. Defining several lexicons and referencing only the lexicon of interest can do this.

It is noted that since the speech recognition module 204 can dynamically change the grammar used given the context of the received speech, the lexicons are dynamically changed, since the lexicons depend on the selected grammar/grammars.

Depending on the size of the system, i.e., how great the search needs to be in the speech decoder 216, the processing time can be reduced. For medium to large size natural language interface control systems 102 (perhaps having many controlled devices 114), the processing time is greatly reduced using an efficient implementation of the Beam Search algorithm. This beam search algorithm aims to keep the number of hypotheses at a minimum during the Viterbi search algorithm. As such, all active hypotheses are compared at each discrete time step and the Viterbi score for the best hypothesis is calculated. Pruning can then be accomplished by discarding any hypotheses whose scores fall below the maximum hypothesis score minus some pre-defined rejection threshold function. This constrains the search based on hypotheses that are pruned and so will not be considered again in the following time steps until the score for the corresponding model states become high enough to pass the threshold.

Another problem associated with large speech recognition systems is the amount of memory required to store the speech models. Fortunately, the number of sub word units (e.g. phonemes), used by the NLICS 102 is typically fixed and hence, more and more speech models will reference the same sub word models as the number of lexicon entries grows. By allowing lexicon entries to reference the same model elements, e.g. sub word models, model states and/or Gaussians, the memory requirements can be kept to a minimum. The tradeoff is a slight increase in the computational resource required. When this indirect model referencing is used, speech can be represented on any level of abstraction (e.g. phrases, words, sub words). Such abstractions can be combined to form more abstract units according to a lexicon, which in turn can be referenced in grammar definitions.

Token Passing is a well-known approach to tracking the best word hypotheses through an HMM. As is known in the art, in connected word recognition systems, the last model state for the state sequence with the highest Viterbi score can be easily found once the processing of all frames of an utterance is completed. However, this does not necessarily provide the best state (or word) sequence. To find the best state sequence, it is required to perform "back tracing". The traditional way of doing this is to let each state contain a pointer back to the previously best state for each frame. Back tracing can then be performed by following the pointers back, starting with the last model state for the state sequence with the highest Viterbi score. This means that if a system uses N states over T discrete time steps, the number of back pointers required is typically NT. This quickly becomes a high number and therefore leads to high memory requirements. Various methods have been proposed to minimize the memory requirements associated with storing such back-pointers, whereof some are based on the idea of passing "tokens" around to the various states instead of allocating memory on a per-state basis.

In accordance with one embodiment of the invention, instead of storing one token pointer in each state, the speech decoder 216 uses two arrays $S_1$ and $S_2$ to hold the token pointers for each state. Array $S_1$ keeps the token pointers for each state and the previous frame, and $S_2$ keeps the token pointers for each state and the current frame. When each state i "looks back" to find the previously best state j, two things can happen. If the previous best state j is a member of the same acoustic model as i, the token pointer for state j in $S_1$ is copied into position i in $S_2$. If this is not the case, a new token is created and stored in position i in $S_2$. The new token gets the same contents as token i in $S_1$, and in the token history, a reference to model m, i∈m, is added. Once all states have been processed for the current frame, the pointers to structures $S_1$ and $S_2$, are swapped, and the process is repeated for the following frame. Thus, this token passing technique provides a highly memory efficient solution to an otherwise well-known problem in HMM-based speech recognition systems; the storage of back-pointers that allows for finding the best word sequence hypothesis once all speech data has been processed.

In some embodiments, a caching scheme is used for the lexicons stored in memory on the remote unit, e.g., by the N-gram grammar module 218. A stated above, a lexicon is a dictionary consisting of words and their pronunciation entries. These pronunciations may be implemented as either phonetic spellings that refer to phonetic models, or to wholeword models. A given word entry may contain alternate pronunciation entries, most of which are seldom used by any single speaker. This redundancy is echoed at each part-ofspeech abstraction, creating even more entries that are never utilized by a given speaker. This implies that if lexicon entries are sorted by their frequency of usage, there is a great chance that the words in an utterance can be found among the top n lexicon entries. As such, the cache is divided into different levels divided by frequency of use. For example, frequently used lexicon entries will be stored within the top level of the cache. A caching scheme may be devised in which the top 10% of the cache is used 90% of the time, for example. Thus, according to an embodiment, a multi-pass search is performed where the most likely entries are considered in the first pass. If the garbage score from this pass is high enough to believe that the words actually spoken were contained in the set of most likely spellings, the speech decoder 216 reports the results to the calling function. If this score is low, the system falls back to considering a wider range of spellings. If the score from the first pass is high, but not high enough in order to be able to make a decision whether the correct spellings, for the elements of the utterance, were contained in the set of most likely spellings, this is also reported back to the calling function, which might prompt the user for clarification. If a lexicon spelling for a given part-of-speech is never used while some of its alternative spellings are frequently used, that spelling is put in a "trash can" and will never be considered for that user. As such, rarely used spellings are not considered and the chance of confusing similar-sounding utterances with one of those spellings is reduced and the recognition accuracy is therefore increased. Further, the caching scheme allows the system to consider less data and hence provides a great speed improvement.

Next, the natural language interface control module 206 will be described in detail. The natural language interface control module 206 includes the natural language interface module 222, the probabilistic context free grammar (PCFG) module 224, the device abstraction module 226, and the feedback module 228. Generally, the natural interface module (NLIM) 222 is responsible for interpreting the user's requests within the context of the devices 114 under control and the user's usage history as defined by a set of probabilistic context-free grammar (PCFG) rules and device abstractions. As such, the natural language interface module 222 asserts control over the speech recognition module 204 and the microphone array 108 search. It does this by controlling the speech recognition module's 204 grammar, and therefore the lexicon under consideration. It also controls system parameters as well as the current state of its device abstractions, and current language references.

As described above, the user initiates a dialog with the NLICS by speaking an attention word. The preferred method of locating the attention word is described with reference to FIG. 3. The user then follows the attention word with an open-ended request constrained only by the capabilities of the devices coupled to the remote unit 104. The attention word alerts to the natural language interface module 222 the identity of the user so that the speech decoder can be instructed to use the proper grammar and models based upon the attention word; thus, the system can preconfigure itself to the speech pattern's (e.g., the pronunciation, structure, habits etc.) of the user.

The speech recognition module 204 transcribes the user's request, which is in natural, conversational language. The utterance is transcribed into a set of alternative hypothesis strings ordered by probability. For example, the speech decoder 216 forwards the N best text strings to the natural language interface module 222 to be analyzed to determine the probable meaning of the utterance.

The natural language interface module 222 then parses the incoming strings by applying a set of probabilistic context free grammar (PCFGs) rules from the PCFG module 224 to find the most likely string, given the string's probability, the user's history, and the current system context. These PCFG rules reflect the context of the user (based on the attention word) and also the context of the device to be operated (if already determined). The PCFGs are initially ordered in terms of frequency of usage as well as likelihood of use. Over time, it tracks habits of individual users and improves rule probability estimations to reflect this data. This data can be shared and combined with data from other systems and then redistributed via the collaborative corpus.

Furthermore, note that the NLICS includes two sets of grammars, one is the N-gram grammar of the speech recognition module 204 and the other is the probabilistic context free grammar module 224 of the natural language interface control module 206. Conventional systems only use one set of grammars, not a combination of N-gram grammar and PCFG rules which are inferred from data collected from man-machine dialog in the domain of personal electronic products.

Using the PCFG rules on the incoming text strings, the natural language interface module 222 reaches one of three conclusions: (1) that it unambiguously understands and can comply with the user request, in which case it carries out the command; (2) that is unambiguously understands and cannot comply with a user request, in which case it informs the user of this conclusion; and (3) that it cannot resolve an ambiguity in the request, in which case, it requests clarification from the user.

For example, in case 1, the natural language interface module 222 interprets an incoming string with a sufficiently high confidence level as a request to "Turn on the television". As such, the appropriate command within the device abstraction module 226 is retrieved and transmitted to the controlled device 114 (i.e., the television). The device abstraction module 226 includes all of the commands to effect the proper requests of the user in the format understandable by the television itself. Typically, the command is transmitted via the device interface 210, e.g., an IR transmitter, to the television. In response, the television is powered on. The second case is the case in which the user asks the NLICS to perform a task it can not perform. For example, the user requests for the television to explode.

The feedback module (e.g. text-to-speech) 228 is instructed to play an audible message over the speaker alerting the user that the request can not be performed. It is noted that the feedback module 228 may simply display notices on a screen display instead of playing an audio signal over the speaker 214.

In the third case, the ambiguity is resolved according to the kind of ambiguity encountered. Thus, the natural language interface module 222 disambiguates the ambiguous request. If the ambiguity arises due to a low confidence, it asks the user to affirm its conclusion. For example, the speaker 214 plays, "Did you mean play the CD?" Alternatively, the natural language interface module 222 asks the user to repeat the request. If the ambiguity arises due to a set of choices, it presents these alternatives to the user, e.g., "Did you want to watch a movie on the VCR or the DVD?" If the ambiguity arises because of the current context, the user is made aware of this, e.g., the user requests to play the DVD player when it is already playing.

In the first two ambiguous situations, the system adjusts the user's profile to reflect the confidence with which a decision was made, as well as preference given a set of alternatives. In some embodiments, over time, these statistics are used to reorder the PCFG rules and entries in the relevant lexicon(s). This results in a faster, more accurate system, since the most likely entries will always be checked earlier and these more likely entries will produce a higher confidence.

It is noted that when the natural language interface module 222 instructs the feedback module 228 to clarify the request, e.g., the speaker 214 plays "Did you mean to play a CD?", the natural language interface module 222 switches the context and grammar rules based on what it is expecting to receive at the microphone array 108. For example, the system will switch to a context of expecting to receive a "yes" or a "no" or any known variants thereof. When the user replies "yes", the natural language interface module 222 switches context back to the original state.

As such, again, when the context changes, the natural language interface module 222 instructs the speech recognition module 204 to switch grammars, which will indirectly cause the lexicons to change, since the grammar controls which lexicons are used.

The natural language interface control module 206 also contains the device abstraction module 226. The device abstraction module 226 stores the abstractions for each device 114. As such, the commands for each device 114 and the objects that each device 114 can manipulate are stored here. It also relates these controls to the states that the devices can be in and the actions they can perform. The content of the device abstraction module 226 depends on the different devices that are coupled to the remote unit 104. The device abstraction module 226 also includes commands for other devices in order to operate another device. For example, if the user requests to play a DVD, then the instructions to power on the DVD player, cause the DVD to play are issued. Additionally, a command signal is sent to turn on the television, if it is not already on.

The commands stored in the device abstraction module 226 are transmitted to the respective controlled device 214 via the device interface 210. In some embodiments, the device interface 210 is an IR or an RF interface.

The NLICS can be implemented to control any device which is controllable via such an IR link. As long as the device abstraction has stored the commands to operate the specific device, the device does not realize that it is being controlled by a natural language interface. It simply thinks its remote control or a universal remote control has sent the signal.

The system processing controller 208 operates as the controller and processor for the various modules in the NLICS. Its function is well understood in the art. Furthermore, the interface 212 is coupled to the system processing controller 208. This allows for connection to the base unit 106, or alternatively, to a computer. The interface 212 may be any other type of link, either wireline or wireless, as known in the art.

It is noted that various components of system, such as the feature extraction module 202, the speech recognition module 204 and the natural language interface control module 206 may be implemented in software or firmware, for example using an application specific integrated circuit (ASIC) or a digital signal processor (DSP).

Figure 3:
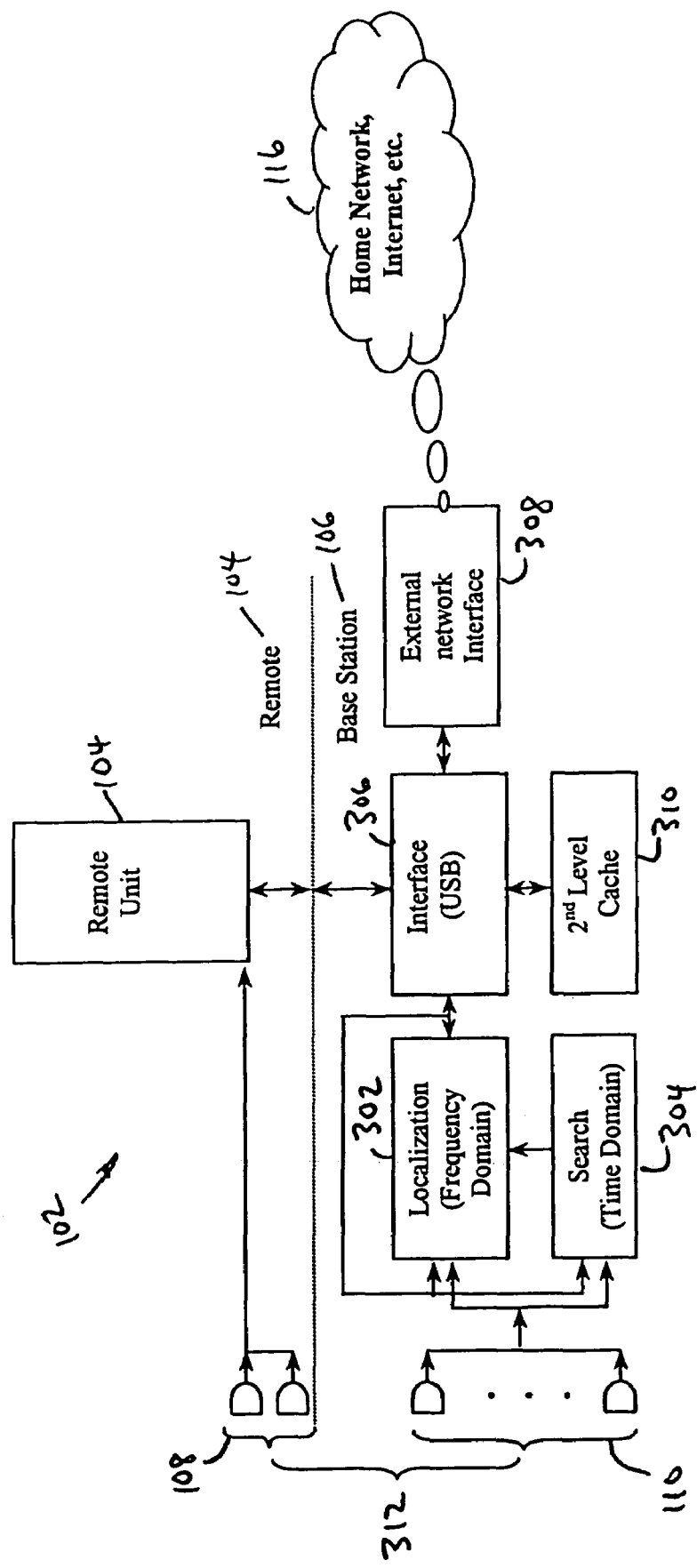
FIG. 3 is a functional block diagram of a base station unit of the natural language interface control system (NLICS) of FIG. 1 in accordance with a further embodiment of the invention.

Referring next to FIG. 3, a functional block diagram is shown of a base unit or base station of the natural language interface control system of FIG. 1 in accordance with a further embodiment of the invention. Shown is the base unit 106 (also referred to as the base station 106) and the remote unit 104 including the linear microphone array 108. The base unit 106 includes the planar microphone array 110, a frequency localization module 302, a time search module 304, a remote interface 306 (also referred to as a remote interface 306), the external network interface 308, and a secondary cache 310. The linear microphone array 108 and the planar microphone array 110 combine to form a three-dimensional microphone array 312 (also referred to as a 3D microphone array 312). Also shown is the external network 116 coupled to the external network interface 308.

In operation, the base unit 106 is intended as a docking station for the remote unit 104 (which is similar to a universal remote control). The base unit 106 includes the external network interface 308 such that the NLICS can interface with an external network 116, such as a home LAN or the Internet either directly or through a hosted Internet portal. As such, additional grammars, speech models, programming information, IR codes, device abstractions, etc. can be downloaded into the base unit 106, for storage in the secondary cache 310, for example.

Furthermore, the NLICS 102 may transmit its grammars, models, and lexicons to a remote server on the external network for storage. This remote storage may become a repository of knowledge that may be retrieved by other such devices. As such, the system will never get old, since lexicons will constantly be updated with the most current pronunciations and usages. This enables a collaborative lexicon and/or a collaborative corpus to be built since multiple natural language interface control systems will individually contribute the external database in a remote server.

Furthermore, the NLICS 102 may download command signals for the device abstraction module of the remote unit 104. For example, a user would like to operate an older VCR that has an IR remote control manufactured by a different maker than the NLICS. The base unit 106 simply downloads the commands that are stored for any number of devices. These commands are then stored in the device abstraction module. Also, the NLICS can submit feature vector data and labels associated with high-confidence utterances to the collaborative corpus. This data I can then be incorporated with other data and used to train improved models that are subsequently redistributed. This approach can also be used to incorporate new words into the collaborative corpus by submitting the feature vector data and its label, which may subsequently be combined with other data and phonetically transcribed using the forward-backward algorithm. This entry may then be added to the lexicon and redistributed.

The base unit 106 includes the planar microphone array 110. The planar microphone array 110 and the linear microphone array 108 of the remote unit 104 combine to form a three-dimensional array 312. Both arrays comprise conventional point source locating microphone. As is known in the art, a three-dimensional array is constructed by first constructing a planar array (e.g., planar microphone array 110), then adding one or two microphone elements off of the plane of the planar array. As such, the linear microphone array 108 becomes the additional one or two elements. This enables the NLICS 102 to define a three dimensional search volume. As such, the device will only search for speech energy within the volume. Thus, the microphone arrays 108 and 110 will localize on a point within the search volume. Speech energy, background noise, etc., outside of the search volume will be attenuated, while speech energy within the search volume will be summed. Practically, the user will need to be positioned within a particular volume to control the various devices. For example, the search volume is configured to be the volume about a user's living room couch.

Both the linear microphone array 108 and the planar microphone array 110 are controlled by the natural language interface module 222. A frequency localization module 302 and a time search module 304 are coupled to the 3D microphone array 110. The time search module 304 receives control signaling from the natural language interface module 222 within the remote unit 104 via the remote interface 306. The time search module 304 adds up time aligned buffers which are provided by the microphones. Thus, the time search module 304 locates putative hits and helps to steer the 3D microphone array 110 in the direction of the hit. The functionality of the time search module 304 is well known in the art.

The frequency localization module 302 is also under the control of the natural language interface module 222. The frequency localization module 302 implements a localization algorithm as is known in the art. The localization algorithm is used to localize speech energy within the defined volume. As such, speech energy originating from outside of the localized point within the volume will attenuate (is out of phase), while speech energy from within the localized point will sum (is in phase). Thus, the localization takes advantage of constructive interference and destructive interference in the frequency domain. In operation, the search module is used to do a coarse search for attention words. If the speech energy passes a threshold, then a fine search is done by the localization module. If it passes the fine search, then the word passed to the recognition and NLI modules. This coarse to narrow search is very helpful in reducing the processing involved in the localization. For example, such localization is very computationally intense since the localization must transform the energy into the frequency domain and back. Thus, by eliminating many putative hits in the coarse search, the processing is reduced. If the SR module identifies the putative hit as an attention word, is passed to the natural language interface module 222 to be analyzed to determine which attention word has been uttered. Note that the context of the natural language interface module is initially of attention words, i.e., the system is searching for attention words to activate the system. Once an attention word is found, the context of the NLICS is caused to change to a request context, such that it will be looking for requests constrained by the devices coupled to the NLICS.

The secondary cache of the base unit 106 is used to store secondary models, grammars and/or lexicons for use in the remote unit 104. This compliments the speech recognition module which is designed to read in (stream) speech models and grammars from a secondary storage device or secondary cache (e.g. hard disk, CDROM, DVD) at run-time. Once the data has been read in, it can immediately be used without any kind of preprocessing. This effectively ties in well with the idea of context switching. In addition to the benefits of low processing requirements and the high speech recognition accuracy that comes with the grammar context-switching feature, the memory requirements are greatly reduced, since less frequently used grammars, etc. may be stored in the secondary cache 310 and read when required without occupying memory within the remote unit 104. Further, more acoustic data can be used which improves speech recognition accuracy, and various approaches to speaker adaptation can be efficiently implemented as secondary storage devices can hold large amounts of base models for different dialects and accents. Furthermore, the secondary cache may be a storage for models, grammars, etc. that are downloaded from an external network 116.

Figure 4:
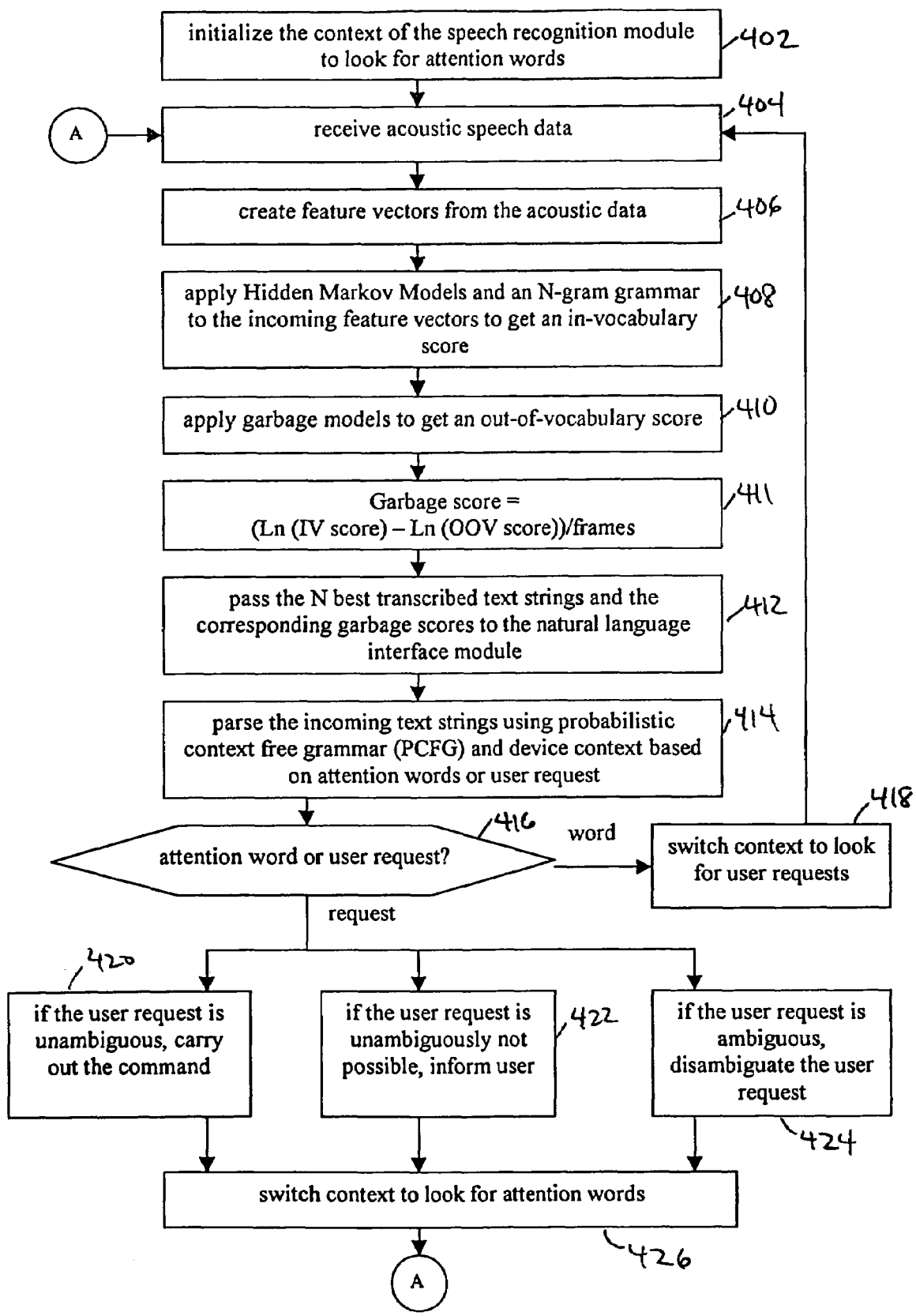
FIG. 4 is a flowchart for the steps performed in the natural language interface algorithm of the natural language interface control system of FIGS. 1 through 3.

Referring next to FIG. 4, a flowchart is shown for the steps performed in the natural language interface algorithm of the natural language interface control system of FIGS. 1 through 3. Initially, the speech recognition module 204 and the natural language interface module 222 are initialized to the context of looking for attention words (Step 402). This allows the NLICS to accept non-prompted user requests, but first the system must be told that a user request is coming. The attention word accomplishes this. As such, the grammars and the models for the hidden Markov models are used to specifically identify the presence of an attention word. Next, the remote unit receives the acoustic speech data at the microphone array (Step 404). The acoustic data is segregated into 12.8 msec frames using a 50% overlap. A 38-dimensional feature vector is derived from the acoustic data. These features consist of Mel-Frequency Cepstral coefficients 1-12 and the first and second order derivatives of MFC coefficients 0-12. Thus, feature vectors are created from the acoustic data (Step 406). This is performed at the feature extraction module 202.

Next, the speech recognition module 204 applies acoustic hidden Markov models (HMM) and an N-gram grammar to the incoming feature vectors (as specified by the natural language interface) to derive an in-vocabulary (IV) Viterbi (likelihood) score (Step 408). Then, the feature data is reprocessed using models of OOV events, e.g., an ergodic bank of monophone models, to derive an out-of-vocabulary (OOV) Viterbi score (Step 410). The garbage score is calculated from the IV and OOV scores, e.g., the garbage score equals [Ln(IV score)−Ln(OOV score)]/number of frames (Block 411). A low score indicates a garbage utterance. The N-best transcribed text string(s) and corresponding garbage score(s) are passed to the natural language interface module 222 (Step 412). The natural language interface module 222 parses the incoming string(s) using a set of probabilistic context-free grammar (PCFG) rules as well as device context information for an attention utterance (Step 414). As described above, the natural language interface module 222 requires an attention strategy, e.g., the receipt of an attention word (i.e., Mona) that is unique to the user, or speaker identification coupled with allowable grammar rules.

Once the user has the system's attention, i.e., the natural language interface module 222 has detected an attention word (Step 416), the natural language interface module knows the user's identity. It proceeds by configuring the system according to the user. It does this by changing the relevant system parameters and by directing the speech recognition module 204 to change grammars to those appropriate for accepting commands and requests and according to the user. The speech recognition module 204 changes lexicons according to the grammar rules and the individual user. Thus, the speech recognition module 204 and the natural language interface module 222 change contexts to look for user requests (Step 418). Additionally, the natural language interface module directs the microphone array of the base unit or base station to narrow its focus in order to better discriminate against environmental noise. Furthermore, if there are devices under NLICS control (TV, CD, etc.) which are playing at a high volume, the natural language interface module directs the amplifier to reduce its volume. Then, the natural language interface module 222 initiates a timer and waits for the user's request until the time-out period has expired. If the system times-out, the natural language interface module 222 reconfigures the system by resetting the relevant speech recognition module rules and lexicon to search for attention words. Also, the microphone array and the amplifier volume are reset if they had been adjusted. These resetting steps are such as those performed in Step 402.

After switching to the context of looking for a user request (Step 418), Steps 404 through 414 are repeated, except that in this pass the acoustic speech represents a user request to operate one or more of the controlled devices.

If the natural language interface module 222 detects a user request (Step 416), i.e. a user request (as determined by the PCFG grammar system and device context) is received, it draws one of three conclusions (Steps 420, 422 or 424). According to Step 420, the user request is unambiguously understood and the natural language interface module can comply with a user request. Thus, the natural language interface module 222 carries out the command by sending the appropriate signals via the device interface 210, as indicated by the device abstraction. Then, the context of the speech recognition module 204 and the natural language interface module 206 is switched back to look for attention words (Step 426), before proceeding to Step 404.

According to Step 422, the user request is unambiguously understood and the natural language interface module cannot comply with the user request. As such, the user is informed of this conclusion and prompts for further direction. The system then waits for further user requests or times out and proceeds to Step 426.

According to Step 424, the ambiguity cannot be resolved for the request, in which case, the natural language interface module 222 requests clarification from the user, e.g., by using the feedback module 228 and the speaker 214. The ambiguity is resolved according to the kind of ambiguity encountered. If the ambiguity arises due to a low confidence, it affirms its conclusion with the user (e.g., "Did you mean play the CD player?"). If the user confirms the conclusion, the command is carried out, and the system is reset (Step 426). The system adjusts the user's profile to reflect the confidence with which a decision was made, as well as preference given a set of alternatives. In some embodiments, over time, these statistics are used to reorder the PCFG rules and entries in the relevant lexicon(s). This results in a faster, more accurate system, since the most likely entries will always be checked earlier and these more likely entries will produce a higher confidence.

If the ambiguity arises due to a set of choices, it presents these alternatives to the user (e.g., "Did you want to watch a movie on the DVD player or the VCR?"). If the user selects from among the options provided, the natural language interface module 222 carries out the command, otherwise the system is reset (Step 426). In either case, the user profile is updated as described above.

If the ambiguity arises because of the current context (e.g., the user requests to stop the TV and it is off), the user is made aware of this.

While the invention herein disclosed has been described by means of specific embodiments and applications thereof, numerous modifications and variations could be made thereto by those skilled in the art without departing from the scope of the invention set forth in the claims.

What is claimed is:

1. A natural language interface control system for operating a plurality of devices comprising:
   a 3 dimensional microphone array;
   a feature extraction module coupled to the first microphone array;
   a speech recognition module coupled to the feature extraction module, wherein the speech recognition module utilizes hidden Markov models and can switch between different acoustic models and different grammars, wherein at least one of the different acoustic models and at least one of the different grammars is downloaded over a network;

a natural language interface module coupled to the speech recognition module; and a device interface coupled to the natural language interface module, wherein the natural language interface module is for operating a plurality of devices of one or more types that are coupled to the device interface based upon non-prompted, open-ended natural language requests from a user;

wherein the natural language interface module abstracts each of the plurality of devices into a respective one of the different grammars and a respective one of a plurality of lexica corresponding to each of the plurality of devices.

2. The system of claim 1 further comprising the plurality of devices coupled to the natural language interface module.

3. The system of claim 1 wherein the speech recognition module utilizes an N gram grammar.

4. The system of claim 1 wherein the natural language interface module utilizes a probabilistic context free grammar.

5. The system of claim 1 wherein the microphone array comprises said 3 dimensional microphone array further comprising a planar microphone array and at least one linear microphone array located in a different plane in space.

6. The system of claim 1 wherein the device interface comprises a wireless device interface.

7. The system of claim 1 further comprising an external network interface coupled to the natural language interface control system.

8. The system of claim 1 further comprising a remote unit containing a first microphone array, the feature extraction module, the speech recognition module, and the natural language interface module, wherein said 3 dimensional microphone array includes the first microphone array.

9. The system of claim 8 further comprising a base unit coupled to the remote unit.

10. The system of claim 9 wherein the base unit includes a second microphone array, wherein said 3 dimensional microphone array includes the second microphone array.

11. The system of claim 10 wherein the first microphone array and the second microphone array implement said 3 dimensional microphone array.

12. A natural language interface control system for operating a plurality of devices comprising:

a 3 dimensional microphone array;

a feature extraction module coupled to the first microphone array;

a speech recognition module coupled to the feature extraction module, wherein the speech recognition module utilizes hidden Markov models and can switch between different acoustic models and different grammars;

a natural language interface module coupled to the speech recognition module; and a device interface coupled to the natural language interface module, wherein the natural language interface module is for operating a plurality of devices of one or more types that are coupled to the device interface based upon non-prompted, open-ended natural language requests from a user;

wherein the natural language interface abstracts each of the plurality of devices into a respective one of a plurality of grammars and a respective one of a plurality of lexica corresponding to each of the plurality of devices.

13. A natural language interface control system for operating a plurality of devices comprising:

a 3 dimensional microphone array;

a feature extraction module coupled to the first microphone array;

a speech recognition module coupled to the feature extraction module, wherein the speech recognition module utilizes hidden Markov models and can switch between different acoustic models and different grammars;

a natural language interface module coupled to the speech recognition module; and a device interface coupled to the natural language interface module, wherein the natural language interface module is for operating a plurality of devices of one or more types that are coupled to the device interface based upon non-prompted, open-ended natural language requests from a user;

wherein the natural language interface module searches for the non-prompted, open-ended user requests upon the receipt and recognition of an attention word.

14. A natural language interface control system for operating a plurality of devices comprising:

a 3 dimensional microphone array;

a feature extraction module coupled to the first microphone array;

a speech recognition module coupled to the feature extraction module, wherein the speech recognition module utilizes hidden Markov models and can switch between different acoustic models and different grammars;

a natural language interface module coupled to the speech recognition module; and a device interface coupled to the natural language interface module, wherein the natural language interface module is for operating a plurality of devices of one or more types that are coupled to the device interface based upon non-prompted, open-ended natural language requests from a user;

wherein the natural language interface module context switches grammars, acoustic models, and lexica upon receipt and recognition of an attention word.

15. A natural language interface control system for operating a plurality of devices comprising:

a 3 dimensional microphone array;

a feature extraction module coupled to the first microphone array;

a speech recognition module coupled to the feature extraction module, wherein the speech recognition module utilizes hidden Markov models and can switch between different acoustic models and different grammars;

a natural language interface module coupled to the speech recognition module;

a device interface coupled to the natural language interface module, wherein the natural language interface module is for operating a plurality of devices of one or more types that are coupled to the device interface based upon non-prompted, open-ended natural language requests from a user; and a grammar module for storing different grammars for each of the plurality of devices.

16. A natural language interface control system for operating a plurality of devices comprising:

a 3 dimensional microphone array;

a feature extraction module coupled to the first microphone array;

a speech recognition module coupled to the feature extraction module, wherein the speech recognition module utilizes hidden Markov models and can switch between different acoustic models and different grammars;

a natural language interface module coupled to the speech recognition module;

a device interface coupled to the natural language interface module, wherein the natural language interface module is for operating a plurality of devices of one or more types that are coupled to the device interface based upon non-prompted, open-ended natural language requests from a user; and an acoustic model module for storing different acoustic models for each of the plurality of devices.

17. A natural language interface control system for operating a plurality of devices comprising:

a first microphone;

a feature extraction module coupled to the first microphone;

a speech recognition module coupled to the feature extraction module;

a natural language interface module coupled to the speech recognition module;

a device interface coupled to the natural language interface module, wherein the natural language interface module is for operating a plurality of devices of one or more types that are coupled to the device interface based upon non-prompted, open-ended natural language requests from a user; and an external network interface coupled to the natural language interface control system;

wherein the natural language interface abstracts each of the plurality of devices into a respective one of a plurality of grammars and a respective one of a plurality of lexica corresponding to each of the plurality of devices.

18. The system of claim 17 further comprising the plurality of devices coupled to the natural language interface module.

19. The system of claim 17 wherein the speech recognition module utilizes an N gram grammar.

20. The system of claim 17 wherein the natural language interface module utilizes a probabilistic context free grammar.

21. The system of claim 17 wherein the microphone array comprises a 3 dimensional microphone array comprising a planar microphone array and at least one linear microphone array located in a different plane in space.

22. The system of claim 17 wherein the natural language interface module searches for the non-prompted, open-ended user requests upon the receipt and recognition of an attention word.

23. The system of claim 17 wherein the natural language interface module context switches grammars, acoustic models, and lexica upon receipt and recognition of an attention word.

24. The system of claim 17 further comprising a grammar module for storing different grammars for each of the plurality of devices.

25. The system of claim 17 further comprising an acoustic model module for storing different acoustic models for each of the plurality of devices.

26. The system of claim 17 wherein the device interface comprises a wireless device interface.

27. The system of claim 17 further comprising a remote unit containing the first microphone array, the feature extraction module, the speech recognition module, and the natural language interface module.

28. The system of claim 27 further comprising a base unit coupled to the remote unit.

29. The system of claim 28 wherein the base unit includes a second microphone array.

30. The system of claim 29 wherein the first microphone comprises a first microphone array, and said first microphone array and the second microphone array implement a 3 dimensional microphone array.

31. The system of claim 17 further comprising a central database coupled to said external network interface, said central database including at least one of grammars; speech models; device abstractions; programming information; and lexica.

32. The system of claim 31 wherein said central database is coupled to said external network interface through an external network.

33. The system of claim 32 further comprising:

a remote server coupled to said external network and to said central database.

34. The system of claim 32 further comprising:

another natural language interface control system; and
another external network interface coupled to said other natural language interface control system, and to said external network.

* * * * *

UNITED STATES PATENT AND TRADEMARK OFFICE
CERTIFICATE OF CORRECTION

PATENT NO. : 7,447,635 B1
APPLICATION NO. : 09/692846
DATED : November 4, 2008
INVENTOR(S) : Konopka et al.

It is certified that error appears in the above-identified patent and that said Letters Patent is hereby corrected as shown below:

On the Title Page, Item -56- under OTHER PUBLICATIONS, line 1, delete "Spohln" and insert --Spoken--.

Claim 1, column 19, line 1, delete "can" and insert --is configured to--.
Claim 1, column 19, line 10, delete "plurality of devices" and insert --plurality of different devices--.
Claim 1, column 19, line 15, delete "plurality of devices" and insert --plurality of different devices--.
Claim 1, column 19, lines 17-18, delete "plurality of devices" and insert --plurality of different devices--.
Claim 2, column 19, lines 19-20, delete "plurality of devices" and insert --plurality of different devices--.
Claim 12, column 19, line 56, delete "can" and insert --is configured to--.
Claim 12, column 19, line 62, delete "plurality of devices" and insert --plurality of different devices--.
Claim 12, column 19, line 67, delete "plurality of devices" and insert --plurality of different devices--.
Claim 12, column 20, line 2, delete "plurality of devices" and insert --plurality of different devices--.
Claim 13, column 20, line 10, delete "can" and insert --is configured to--.
Claim 13, column 20, line 16, delete "plurality of devices" and insert --plurality of different devices--.
Claim 14, column 20, line 30, delete "can" and insert --is configured to--.
Claim 14, column 20, line 36, delete "plurality of devices" and insert --plurality of different devices--.
Claim 15, column 20, line 51, delete "can" and insert --is configured to--.
Claim 15, column 20, line 57, delete "plurality of devices" and insert --plurality of different devices--.
Claim 15, column 20, line 62, delete "plurality of devices" and insert --plurality of different devices--.
Claim 16, column 21, line 3, delete "can" and insert --is configured to--.
Claim 16, column 21, line 9, delete "plurality of devices" and insert --plurality of different devices--.
Claim 16, column 21, line 14, delete "plurality of devices" and insert --plurality of different devices--.

UNITED STATES PATENT AND TRADEMARK OFFICE
CERTIFICATE OF CORRECTION

PATENT NO. : 7,447,635 B1
APPLICATION NO. : 09/692846
DATED : November 4, 2008
INVENTOR(S) : Konopka et al.

It is certified that error appears in the above-identified patent and that said Letters Patent is hereby corrected as shown below:

Claim 17, column 21, line 26, delete "plurality of devices" and insert --plurality of different devices--.
Claim 17, column 21, line 33, delete "plurality of devices" and insert --plurality of different devices--.
Claim 17, column 21, line 35, delete "plurality of devices" and insert --plurality of different devices--.
Claim 24, column 22, lines 10-11, delete "plurality of devices" and insert --plurality of different devices--.
Claim 25, column 22, line 14, delete "plurality of devices" and insert --plurality of different devices--.

Signed and Sealed this

Twenty-fourth Day of March, 2009

JOHN DOLL
*Acting Director of the United States Patent and Trademark Office*